United States Patent [19]

Kawamura

[11] 3,915,599

[45] Oct. 28, 1975

[54] STRUCTURE FOR PREVENTING LEAKAGE OF LUBRICATING OIL IN ROTARY-PISTON INTERNAL COMBUSTION ENGINES

[75] Inventor: Kazuhiro Kawamura, Toyota, Japan

[73] Assignee: Toyota Jidosha Kogyo Kabushiki Kaisha, Toyota, Japan

[22] Filed: May 29, 1974

[21] Appl. No.: 474,349

[30] Foreign Application Priority Data

June 6, 1973   Japan.............................. 48-66109

[52] U.S. Cl. .................. 418/91; 418/104; 123/8.01; 277/81 P; 277/96 A
[51] Int. Cl.² .................... F01C 21/06; F01C 19/12; F02B 55/04
[58] Field of Search .......... 418/61 A, 91, 104, 142; 123/8.01; 277/81 P, 96 A, 81 R

[56] References Cited
UNITED STATES PATENTS

| 1,470,587 | 10/1923 | Somes................ 277/96 A |
| 3,167,058 | 1/1965 | Czike et al........................ 123/8.01 |
| 3,333,763 | 8/1967 | Jungbluth et al. .................... 418/91 |

FOREIGN PATENTS OR APPLICATIONS

| 1,451,727 | 8/1969 | Germany ............................ 418/104 |

Primary Examiner—John J. Vrablik
Attorney, Agent, or Firm—Stevens, Davis, Miller & Mosher

[57] ABSTRACT

Disclosed herein is a structure for preventing leakage of lubricating oil in rotary-piston internal combustion engines. The structure comprises passages formed in the side walls of a rotor to allow a rotary shaft to rotatably extend therethrough, each passage having a counter-tapered opening, which diverges toward a combustion chamber. Oil seal rings are interposed between the rotary shaft and the passages.

1 Claim, 1 Drawing Figure

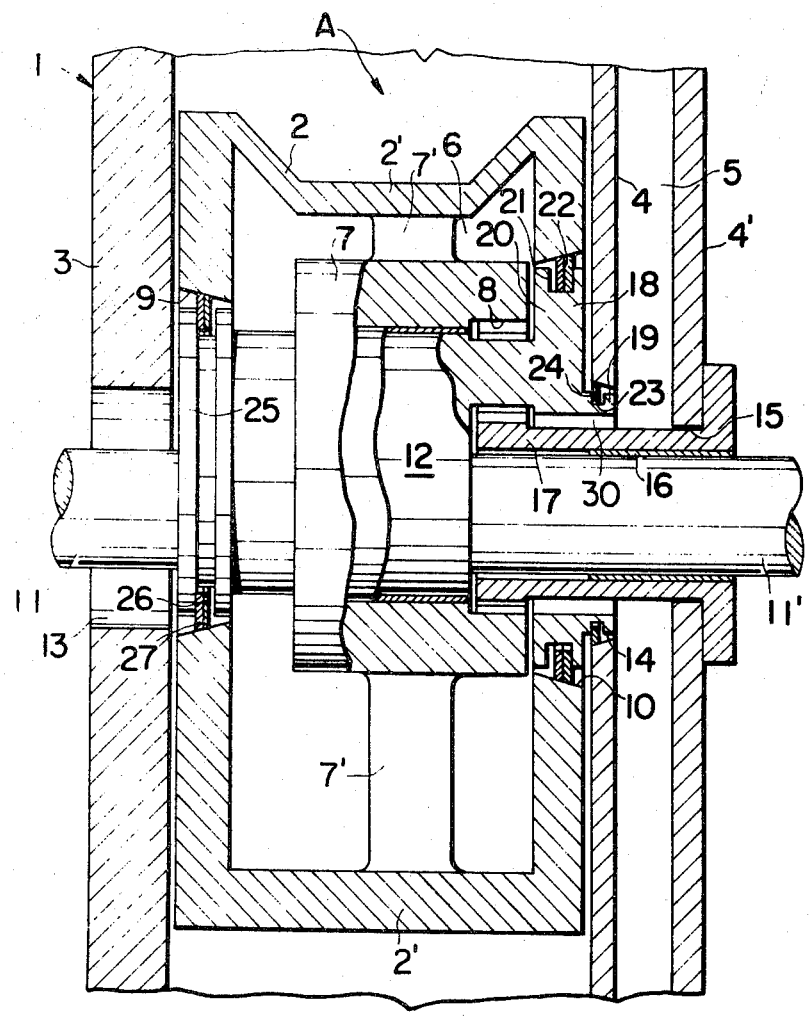

STRUCTURE FOR PREVENTING LEAKAGE OF LUBRICATING OIL IN ROTARY-PISTON INTERNAL COMBUSTION ENGINES

BACKGROUND OF THE INVENTION

This invention relates to a structure for preventing the lubricating oil for cooling a piston of a rotary piston engine from leaking into the combustion chamber.

The prior art oil seals for rotary piston internal combustion engines have been of the scraper type. These seals have suffered from inferior adaptability to the surface roughness of the side walls of the rotor housing and to the tilt of the rotor. Moreover, problems have been encountered in the deterioration of sealing performance and durability due to thermal deterioration of O-rings used and to early wear of the lip of the oil seal. Also, oil seals of the piston-ring type which utilize gas pressure leaking from the combustion chamber have been impossible to adapt to a rotary engine having an intake port in the side wall of its rotor housing, and complications arise in the assembly of rotary engines with seals of the piston-ring type.

SUMMARY OF THE INVENTION

An object of the invention is to overcome the above drawbacks inherent in the prior art.

Another object of the invention is to prolong the durability of a lubricating-oil leakage preventive structure for use in a rotary engine and to ensure reliable sealing performance against lubricating oil leakage even where an intake port is formed in the side wall of the rotor housing.

According to the invention, the lubricating-oil leakage preventive structure comprises passages formed in the side walls of a rotor and/or in one of the side walls of an engine housing. Each passage has a counter-tapered opening which diverges toward the engine combustion chamber, and oil seal rings are interposed between the engine rotary shaft and the passages.

BRIEF DESCRIPTION OF THE DRAWING

The accompanying drawing shows a fragmentary sectional view of a rotary-piston internal combustion engine equipped with a structure for preventing leakage of lubricating oil according to the invention.

DESCRIPTION OF A PREFERRED EMBODIMENT

Referring now to the accompanying drawing, a rotary-piston internal combustion engine is shown which is equipped with a rotor housing 1 composed of a peripheral wall (not shown) and side walls 3 and 4. An eccentrically rotatable rotor 2 is disposed within the rotor housing 1. Another side wall 4' is disposed at the outer side of the end wall 4 at a spacing therefrom to define a small oil chamber 5. The peripheral wall and the sidewalls 3 and 4 define a working chamber wherein the rotor 2 eccentrically rotates. A combustion chamber A is formed by the walls 3 and 4 and the peripheral wall of the rotor housing 1 and the rotor 2. The rotor 2 is formed with an oil reserving chamber 6, which reserves lubricating oil for cooling the rotor 2. A cylindrical body 7 made coaxial with the rotor 2 is disposed in the chamber 6 and is secured to stays 7' formed on the inner peripheral wall 2' of the rotor 2. The cylindrical body 7 is equipped with an internal gear 8 disposed at the side of the body 7 nearest the side wall 4. The rotor 2 has its side walls formed with counter-tapered bores or openings 9 and 10, through which the rotary shaft to be described later rotatably extend. An eccentric shaft portion 12 having the rotary shafts 11 and 11' is inserted in the cylindrical body 7. The side walls 3 and 4 are formed with bores or openings 13 and 14 aligned with the openings 9 and 10 of the rotor 2. The bore 14 is countertapered in an inwardly divergent fashion. A bore 15 is provided in side wall 4' in which is fitted a stem of a stationary gear 17 having an axial through bore 16. The stationary gear 17 meshes with the internal gear 8. The shaft 11' is made integral with the eccentric shaft portion 12 on the side of the internal gear 8 and is rotatably inserted through bore 16. The other shaft 11 extends through the bore 13 formed in the side wall 3 and is supported in a bearing (not shown).

When the rotor 2 is rotated in an eccentric motion, the eccentric shaft portion 12 is rotatably driven by the cylindrical body 7' and the internal gear 8 thereof is guided around the stationary gear 17', thereby turning the shafts 11 and 11'. The eccentric shaft portion 12 is formed at the side of the internal gear 8 with an integral oil slinger 20, which has a circular portion 18 so located as to face the opening 10 in the side wall of the rotor 2, a circular portion 19 so located as to face the opening 14 in the side wall 4 and a bore for allowing the stationary gear 17 to extend therethrough. The periphery of the circular portion 18 of the oil slinger 20 is formed with an annular groove 21, in which an oil seal ring 22 is fitted to maintain seal between the outer periphery of the circular portion 18 and the counter-tapered surface of the bore 10. The circular portion 19 is likewise formed with a peripheral annular groove 23, in which an oil seal ring 24 is fitted to maintain seal between the outer periphery of the circular portion 19 and the counter-tapered surface of the bore 14. The portion of eccentric shaft 12 nearest side wall 3 is further formed with a circular portion 25 of an increased diameter which is located in a manner to face the bore 9 of the rotor 2. The circular portion 25 is formed with a peripheral annular groove 26, in which an oil seal ring 27 is fitted to maintain seal between the outer periphery of the circular portion 25 and the counter-tapered surface of the bore 9. The oil seal rings 22, 24 and 27 themselves are capable of bending and have considerable resiliency.

In operation, as the rotor 2 eccentrically rotates in the combustion chamber A for the intake, compression, explosion and exhaust strokes, the shafts 11 and 11' are also turned accordingly. With the lubricating-oil leakage preventive structure according to the invention, the oil seal rings 22 and 24 mounted on oil slinger 20 and the seal ring 27 mounted on the eccentric shaft portion 12 will rotate in unison with the eccentric shaft portion 12, with the peripheral edges of the seals being in sliding contact with the corresponding countertapered surfaces of the bores 10, 14 and 9. At this instant, the oil seal rings 22 and 27 are thrust against the corresponding counter-tapered surfaces of the bores, and the forced contact is remarkably strong due to the strong radial component of the resilient force of the oil seal ring itself as well as the strong axial component of the resilient force. At the same time, sufficiently hermetic contact of the oil seal rings 22 and 27 with the annular grooves 21 and 26 is obtained. Thus, the lubricating oil in the oil reserving chamber 6 of the rotor 2 can be prevented from entering the combustion chamber A through the openings 10 and 9. However, the lubricating oil in the chamber 6 will enter into the small chamber 5 defined between the side walls 4 and 4' through the clearance formed between the oil slinger 20 and the stationary gear 17. In this case, however, the lubricating oil in the oil reserving chamber 6 will enter through the clearance 30 formed between the oil slinger 20 and the stationary gear 17 into the small chamber 5 defined between the side walls 4 and 4'. In this case, the oil seal ring 24 also acts in the same manner as the oil seal rings 22 and 27 for sealing the bore 14 of the side wall 4, so that the lubricating oil in the small chamber 5 will be prevented from entering through the bore 14 into the combustion chamber A.

As has been described above, utilizing the lubricating oil leakage preventive structure according to the invention, the oil seal rings can be held in forced contact with the countertapered surfaces at the openings of the lubricating oil chamber and with the annular grooves formed on the periphery of the circular portions located in the openings, so that reliable seal against leakage of the lubricating oil through these openings can be ensured. Further, since the oil seal rings for maintaining the seal between the lubricating-oil reserving chamber in the rotor and the combustion chamber can be kept from contact with the side walls, the oil seal performance can be maintained at an excellent level, even if the friction at the side walls is considerable or if there is a tilt of the rotor. Further, no lubricating oil will leak even when the engine is stopped. Furthermore, in the rotary-piston internal combustion engine employing the lubricating oil leakage preventive structure according to the invention, it is possible to locate an intake port at any position of the side wall, that is, at a position suitable for maximizing the engine output efficiency and for minimizing the exhaust gas emission. Still further, the oil seal ring according to the invention, unlike the conventional O-ring, is free from deterioration of its seal performance. While in the preceding embodiment, the oil seal rings are disposed at the side of the shaft, similar effective sealing may also be obtained even if the seals are at the sides of the rotor.

While having shown and described a preferred embodiment of the invention, it is to be understood that the invention is not limited thereto, but is to be defined by the appended claims.

What is claimed is:

1. A structure for use in a rotary-piston internal combustion engine for preventing leakage of lubricating oil, comprising an engine housing including a peripheral wall and side walls, an eccentrically rotatable rotor disposed between said side walls for forming a volume-varying combustion chamber with said peripheral wall and said side walls and a rotary shaft driven by said rotor for rotational motion, wherein the improvement comprises:

a first oil chamber formed in said rotor for reserving the lubricating oil which is to cool said rotor shaft;

a second oil chamber formed in one of the side walls of said engine housing for collecting the lubricating oil leaking from the first-named oil chamber;

passages formed in the side walls of said rotor for allowing said rotary shaft to rotatably extend therethrough and each having a counter-tapered opening which diverges toward the combustion chamber;

a passage formed in one of the side walls of said engine housing for passing therethrough the leaking lubricating oil from the first-named oil chamber to the second-named oil chamber and having a counter-tapered opening which diverges toward the combustion chamber; and oil seal rings each interposed between said rotary shaft and the first- and second-named passages thrustable along the axis of said shaft in tight contact with the counter-tapered surfaces of said openings in said passages by the blow-by gases produced in said combustion chambers.

* * * * *